US008016097B2

(12) United States Patent
Stuffel et al.

(10) Patent No.: US 8,016,097 B2
(45) Date of Patent: Sep. 13, 2011

(54) ESCALATOR LINEAR BELT HANDRAIL DRIVE

(75) Inventors: Andreas Stuffel, Buckeburg (DE); Helmut Meyer, Buckeburg (DE); Klaus Rohrbach, Buckeburg (DE)

(73) Assignee: Otis Elevator Company, Farmington, CT (US)

( * ) Notice: Subject to any disclaimer, the term of this patent is extended or adjusted under 35 U.S.C. 154(b) by 944 days.

(21) Appl. No.: 10/543,879

(22) PCT Filed: Feb. 6, 2003

(86) PCT No.: PCT/US03/03726

§ 371 (c)(1),
(2), (4) Date: Jul. 27, 2005

(87) PCT Pub. No.: WO2004/071928

PCT Pub. Date: Aug. 26, 2004

(65) Prior Publication Data

US 2006/0070846 A1 Apr. 6, 2006

(51) Int. Cl.
*B65G 23/12* (2006.01)

(52) U.S. Cl. ........................................ 198/331; 198/335

(58) Field of Classification Search .................. 198/321, 198/326, 330, 331, 335
See application file for complete search history.

(56) References Cited

U.S. PATENT DOCUMENTS

| | | | | |
|---|---|---|---|---|
| 3,779,360 | A * | 12/1973 | Taher et al. | 198/335 |
| 4,134,883 | A * | 1/1979 | Mendelsohn et al. | 528/63 |
| 4,895,240 | A | 1/1990 | Bruehl | |
| 5,125,494 | A | 6/1992 | Nurnberg | |
| 5,522,492 | A | 6/1996 | Spriggs | |
| 5,755,315 | A | 5/1998 | Wallbaum | |
| 5,881,859 | A * | 3/1999 | Bianchi | 198/335 |
| 6,199,678 | B1 | 3/2001 | Reo | |

* cited by examiner

*Primary Examiner* — Kavel Singh
(74) *Attorney, Agent, or Firm* — Carlson, Gaskey & Olds, PC

(57) ABSTRACT

An escalator handrail drive arrangement includes a drive belt (26) mounted within a drive housing (35). Pressure rollers (30) are mounted in pairs and pivotally attached to the drive housing. The pressure rollers bias a handrail (22) against the drive belt. The pressure roller arrangements are mounted at each axial end. A spring (44) biases the pressure roller arrangements against the handrail, with the spring being centered along the axial length of the pressure rollers. This spring is preferably mounted within the drive housing such that no additional space is required outwardly of the drive and roller arrangement to accommodate the spring.

13 Claims, 2 Drawing Sheets

ESCALATOR LINEAR BELT HANDRAIL DRIVE

BACKGROUND OF THE INVENTION

This application relates to a belt handrail drive for an escalator wherein the pressure rollers are mounted to the drive housing at both axial ends, with a centrally located spring.

Escalators typically have a handrail that is driven by drive rollers through a drive belt. To hold the handrail in good frictional contact with the drive belt, pressure rollers are typically mounted on an opposed side of the handrail from the drive belt and spring biased against the handrail.

In the prior art, the pressure rollers have typically been cantilever mounted. Further, the spring for biasing the pressure roller against the handrail has been mounted outwardly of the roller axial length, at the end of a housing at which the pressure rollers are mounted. The spring has typically been mounted beneath the handrail, to bias the roller upwardly. The pressure rollers are typically mounted in a plate which pivots relative to a drive housing. Since the spring is outwardly of the axial length of the roller, additional width is required. Further, since the spring is not centered on the roller, the force applied by the pressure roller is not equal along the length of the roller.

In the past, the rollers have sometimes tilted along an axis due to the position of the spring. Further, unequal pressure along the width of the roller has sometimes resulted in uneven wear of the rollers and handrail.

SUMMARY OF THE INVENTION

In the disclosed embodiment of this invention, the pressure rollers are mounted to the drive housing at both axial ends. The tilting described above is thus eliminated. Further, the spring is preferably mounted within the axial length of the roller. In this way, uneven wear and tilting as described above are eliminated.

Further, the spring is most preferably mounted within the drive housing such that no additional space is required to provide the spring for the pressure roller.

In a further feature, an adjustment screw can adjust the bias force from the spring. A stop is provided within the drive housing to limit the amount of tension that can be applied to the spring such that the force can be limited.

While the invention is described in an escalator, it should also be understood that the benefits for the pressure roller drive described in this application would apply equally to other linear passenger conveying mechanisms such as moving walk ways, etc.

These and other features of the present invention can be best understood from the following specification and drawings, the following of which is a brief description.

DETAILED DESCRIPTION OF THE PREFERRED EMBODIMENTS

Figure 1:
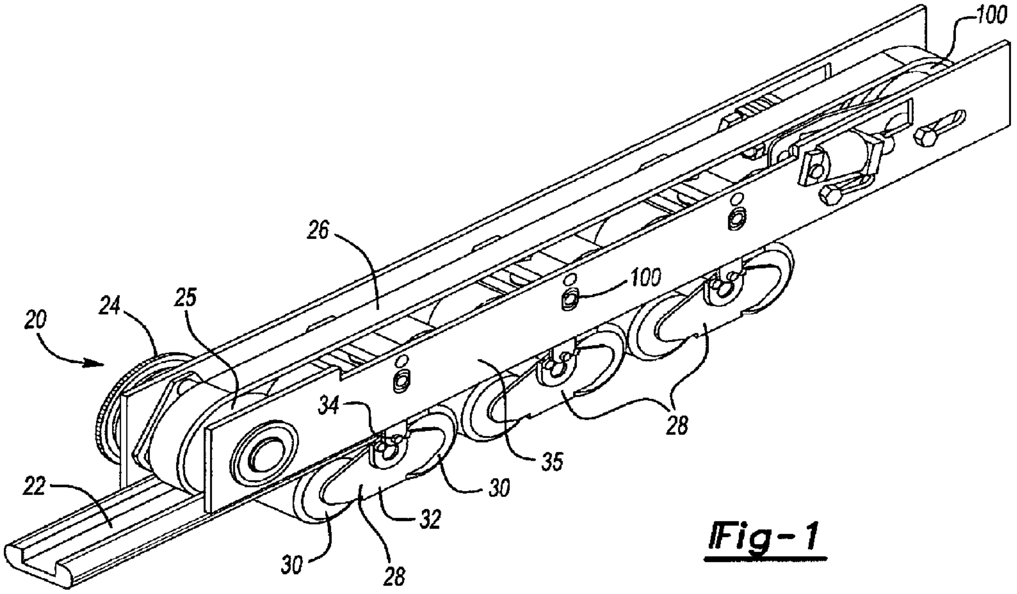
FIG. 1 is a schematic view of a portion of an escalator handrail drive.

FIG. 1 shows a handrail drive arrangement 20 including a handrail 22. A drive input 24 drives a roller 25 to in turn drive a belt drive 26. Belt drive 26 frictionally engages and drives handrail 22. As can be seen the belt 26 circles around the roller 25, and an opposed roller 100 and an opposed end of the belt. As known, the belt 26 would be an endless belt running over a path between the rollers 25 and 100.

Pressure roller pairs 28 are biased upwardly as shown in FIG. 1 to hold the handrail 22 against the belt 26. The pressure roller pairs 28 each include a pair of pressure rollers 30 connected by pressure roller housings 32, and pivotally connected as shown at 34 to the drive housing 35.

Figure 2:
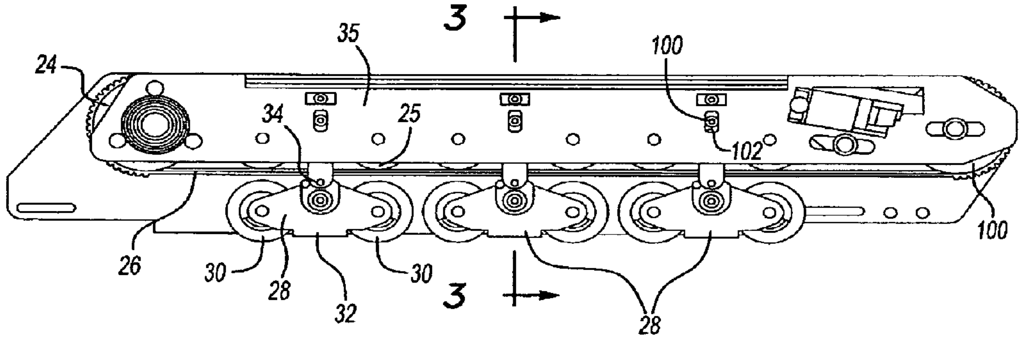
FIG. 2 is a side view of the drive arrangement with a pressure roller arrangement.

As shown in FIG. 2, there are several pressure roller pairs 32. The pressure rollers are mounted slightly beneath the belt 26.

Figure 3:
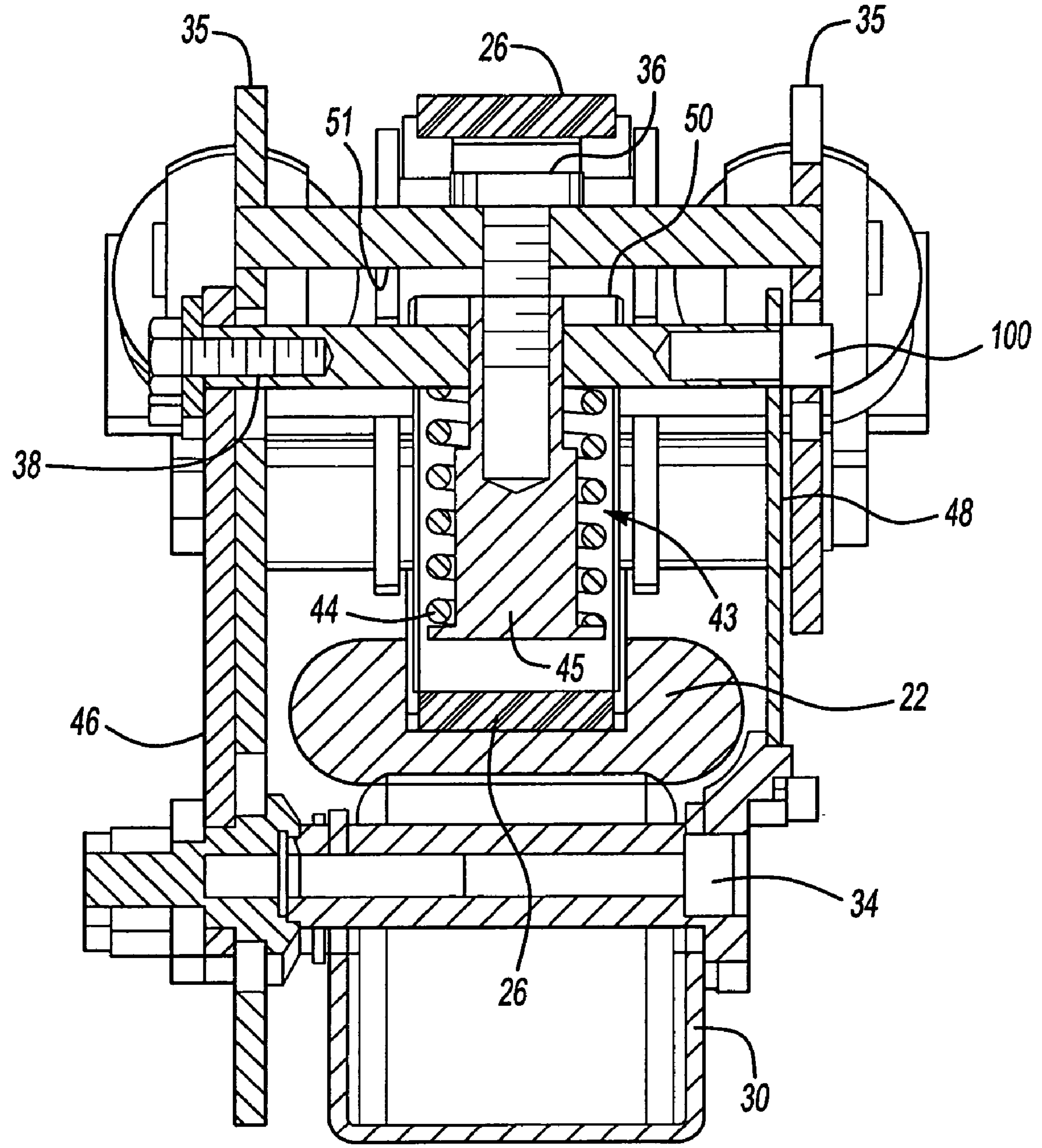
FIG. 3 is a cross-sectional view along line 3-3 as shown in FIG. 2. embodiment.

As shown in FIG. 3, the housing 32 includes two opposed side plates 48 and 46. Rollers 30 are mounted between plates 48 and 46. Thus, the rollers 30 are mounted at each axial end. Further, the pivotal connection 34 connects plates 48 and 46. Adjustment bar 100 serves as a reaction surface for a spring arrangement 43. Spring arrangement 43 includes spring 44, and a member 45 which is pulled upwardly by adjustment of a screw 36 to adjust the force from the spring 44 against the bar 100. As is clear, the bar 100 is guided in slots 102 in side plates of drive housing 35.

As can be appreciated in FIG. 3, the spring 44 thus biases the rollers 30 upwardly with the side plates 48 and 46. Notably, the spring 44 is within the axial length of the rollers 30, and preferably is centered on the axial length of the rollers 30. Moreover, the spring 44 is above the belt 22 such that no additional space is required for the provision of the spring. Instead, the spring is actually incorporated within the drive housing 35, and yet still biases the rollers against the handrail 22.

Further, a stop 50 limits the amount of adjustment of the spring 44 by abutting a fixed surface 51 within the drive housing to limit the amount of force which can be applied to the spring through adjustment of the screw 36.

Thus, the present invention provides an arrangement wherein the pressure rollers are spring biased by a centrally located spring, and along the length of the roller. Moreover, the pressure roller is mounted on each side, preventing the tilting and uneven wear which has been an issue in the prior art. Further, the location of the spring provides a much smaller envelope and thus a reduced required space.

Although a preferred embodiment of this invention has been disclosed, a worker of ordinary skill in this art would recognize that certain modifications would come within the scope of this invention. For that reason, the following claims should be studied to determine the true scope and content of this invention.

We claim:

1. A drive arrangement for a handrail comprising:

a handrail to be driven along a path of travel;

a drive input driving a drive belt, said drive belt being in frictional engagement with said handrail; and at least one pressure roller on an opposed side of said handrail from said drive belt, said pressure roller biasing said handrail against said drive belt, and said pressure roller extending along an axis of rotation between first and second ends, with said pressure roller being mounted at each of said first and second ends in a pressure roller housing.

2. An arrangement as set forth in claim 1, wherein a spring biases said pressure roller against said handrail, with said spring being mounted along said axis of said pressure roller, and between said first and second ends.

3. An arrangement as set forth in claim 2, wherein said spring is centered between said first and second ends.

4. An arrangement as set forth in claim 2, wherein said spring is on an opposed side of said handrail from said pressure roller.

5. An arrangement as set forth in claim 2, wherein said drive input is mounted within a drive housing, said drive housing also mounting said drive belt, said pressure roller housing being pivotally mounted in said drive housing.

6. An arrangement as set forth in claim 5, wherein said drive housing receiving said bias spring, such that said bias spring is within said drive housing, and on an opposed side of said handrail from said pressure roller.

7. A conveyer as set forth in claim 6, wherein an adjustment screw can be turned to adjust a force from said bias spring.

8. An arrangement as set forth in claim 7, wherein said adjustment screw drives a spring holding member, said adjustment screw moving a bar through said bias spring to in turn move said pressure roller pairs, and said bar being guided within said drive housing.

9. An arrangement as set forth in claim 1, wherein there are a pair of said pressure roller mounted to said pressure roller housing, said pressure roller housing being pivotally attached to a drive housing.

10. An arrangement as set forth in claim 1, wherein said handrail is part of a passenger conveyer.

11. An arrangement as set forth in claim 10, wherein said passenger conveyer is an escalator.

12. An arrangement as set forth in claim 1, wherein said pressure roller housing is pivotally attached to a drive housing.

13. An arrangement as set forth in claim 1, wherein said drive belt is an endless member being driven around at least a pair of spaced rollers.

* * * * *